Patented Jan. 31, 1950

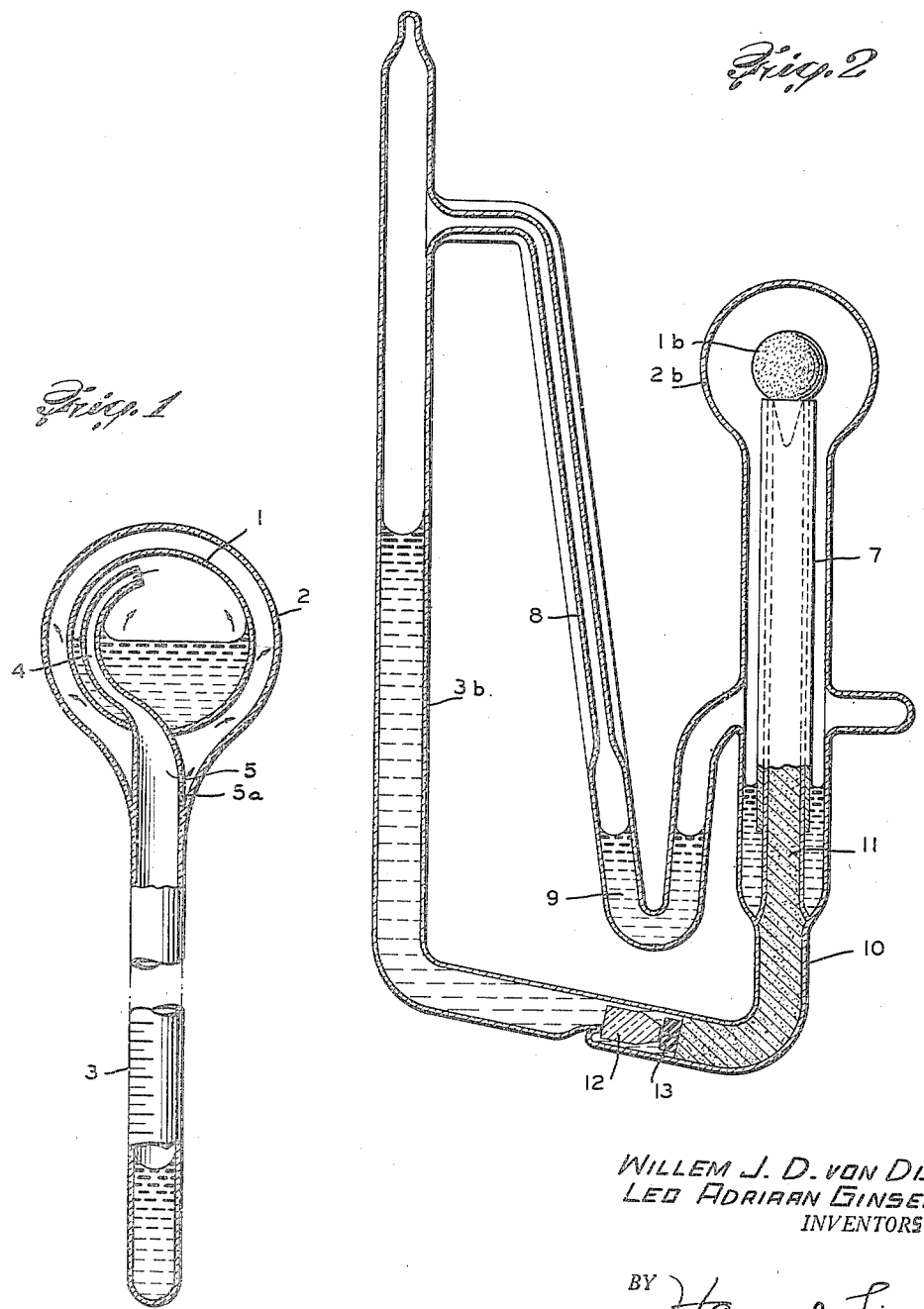

2,496,239

UNITED STATES PATENT OFFICE 2,496,239

APPARATUS FOR MEASURING RADIATION

Willem Johannes Dominicus van Dijck, The Hague, and Leo Adriaan Ginsel, Nootdorp, Netherlands, assignors to Nederlandsche Centrale Organisatie voor Toegepast-Natuurwetenschappelijk Onderzoek, The Hague, Netherlands Application November 16, 1946, Serial No. 710,338
In the Netherlands February 11, 1944

Section 1, Public Law 690, August 8, 1946
Patent expires February 11, 1964

9 Claims. (Cl. 73—170)

This invention relates to an apparatus for measuring radiation, of the type of the Lucimeter of Bellani as described in the Météorologie 1926, page 497, which comprises two concentric bulbs in conjunction with a calibrated measuring tube, the outer bulb being pervious or transparent to the radiation to be measured while the inner bulb absorbs the radiation and contains a liquid vaporizable by the energy of the radiation. In the Lucimeter of Bellani the space between the two bulbs is evacuated in order to reduce the direct loss of heat of the inner bulb to the surroundings. The working of such a radiometer is based on the fact that the heat produced by the radiation absorbed by the inner bulb, for example, sun-radiation, makes the liquid distill out of this bulb into the measuring tube. Another part of the heat, however, is given up directly to the surroundings. This part is surely smaller than would be the case if the vacuum jacket were lacking, but nevertheless it has a fairly high value.

According to this invention an improvement of the Bellani type radiometer is obtained by causing the vapor-space of the inner bulb to communicate with the space between the bulbs. In this manner the outer bulb serves as a condensing surface. From this it results that the evaporating liquid surface and the "surroundings" practically have the same temperature, so that the heat transmission by radiation and convection is practically nought and practically all the radiation energy supplied to the evaporating surface is used for evaporation.

Other features of this invention will appear from the following detailed description and the accompanying drawing exemplifying preferred embodiments thereof.

Fig. 1 of the drawings is an elevational view, partly in section, of one embodiment of the invention.

Fig. 2 of the drawing is an elevational view, partly in section of a second embodiment of the invention.

In the embodiment illustrated by Fig. 1, the inner bulb 1 contains a vaporizable liquid. This bulb 1 is surrounded by the cover 2 which must be pervious or transparent to the radiation to be measured. The vapours developed in the bulb 1 in consequence of the absorbed radiation energy can escape through the outlet pipe 4. The said outlet pipe discharges into the measuring tube 3 but at the same time communicates with the space inside the cover 2 between it and the bulb 1, e. g. by way of one or more apertures 5.

At least one of these apertures, as shown, for example, at 5a, is located so that all the liquid condensing on the inner wall of the outer bulb or cover 2 can flow into the measuring tube. The space inside the apparatus is freed of foreign gases or vapours as much as possible.

The vessel 1 may be made of widely different materials. So the wall of the vessel 1 also may be made, for instance, of material which is pervious to the radiation to be measured. In this case the liquid in the said vessel is chosen such that it absorbs the radiation more or less. So the vessel may be filled, for instance, with a coloured liquid absorbing a certain field of wavelengths from the sun-spectrum. In this case the concentration of the dye-stuff preferably is taken so small that the quantity of the absorbed energy is independent from the degree of reduction of the volume of the liquid in the bulb 1 effected by evaporation and also from the angle of incidence of the entering rays, and thus depends exclusively upon the total number of absorbing molecules and on the incident energy.

Herewith it should be borne in mind that, if coloured liquids that constitute true solutions of dyestuffs are used for measuring certain parts of the sun spectrum, the concentration of the dyestuff should be extremely weak, as otherwise the evaporation of the liquid only starts at a certain minimum radiation on account of the reduction of the vapour-tension. If it is required to measure the radiation only above a certain minimum, therefore, this can be done by choosing a certain concentration of dyestuff. In the other cases mostly colloidal dyestuffs will be chosen or extremely low concentrations will be used.

The vessel 1 may also be made of a heat-conductive material, e. g. a metal, in which case care is taken that the metal is covered with a suitable layer for absorbing the radiation to be measured.

Further, the wall of the radiation absorbing body may advantageously be made of porous material, e. g. porous stoneware, through which the liquid inside the said body is sucked to the outside and here evaporates. The outer surface of the body in this case heretofore must be treated in such a way that no liquid escapes as such through the pores. To this end the pores of the surface can be filled up with a very finely divided material, or the outer surface can be covered with a thin porous liquid-repelling layer. Now care is taken that either the wall or the liquid or, if required, both of them absorb the radiation to be measured. Preferably in this case the porous wall will be chosen as the radiation absorbing material, for which purpose it is coloured.

The advantages connected with the use of a porous bulb as an evaporating surface are:

(a) By making use of the capillary suction of the porous bulb the liquid supply to the bulb can be effected from a container situated outside the evaporating surface. The dimensions of the radiometer therefore may be smaller than if the liquid container is to be placed inside the evaporating surface.

(b) The (sun-)radiation is absorbed directly on the evaporating surface. The radiation energy supplied is thus directly removed by evaporation and it is not necessary to supply the same first to and through the evaporating surface. This latter procedure generally leads to the removal of a part of the supplied radiation energy in another manner than by evaporation.

(c) The vapor does not need to pass narrow channels or apertures on its way from the evaporating to the condensing surface, so that the heat transmission by evaporation and condensation is as large as possible and the heat transmission by conduction and radiation is as small as possible.

(d) No high demands need be made upon the vacuum in the radiometer.

Another embodiment of an apparatus according to the invention is shown in Fig. 2. With regard to the apparatus according to Fig. 1 this embodiment has the important advantage that the body which absorbs the radiation to be measured only contains a small part of the total quantity of liquid, so that the dimensions of the apparatus can be chosen considerably smaller.

In this apparatus the body 1b which absorbs the radiation to be measured, consists of a small solid porous bulb surrounded by the outer bulb or cover 2b which is pervious to the radiation to be measured. The small porous bulb communicates with the liquid container 3b by means of a small tube 10 filled with a finely divided powder 11, e. g. quartz-sand. In order to obtain a good junction of the powder in the tube 10 with the bulb 1b, a rubber stop 12 followed by a glass stop 13 is fitted against the powder in the lower part of the tube; both stops provide a channel for the passage of liquid from the container 3b.

Because of the capillary action of the powder in 10 and of the small bulb 1b the latter remains always saturated with liquid.

Therefore the liquid evaporating from 1b as a result of the radiation to be measured is supplied continuously from the container 3b. The fall of the liquid level in 3b caused by this action is taken as a measure for the incident radiation.

The tube 10 filled with finely divided powder must be in close heat-contact with the outer wall, as otherwise extra evaporation in the bulb 1b caused by heat-conduction would lead to errors. This may, for instance, be obtained by surrounding the tube 10 with a thin cover 7 of sintered milk-glass which is kept saturated with liquid by taking care that the lower part of it constantly stands in the condensed liquid collected in the lower part of the cover 2b. In this manner all energy absorbed by 10 is dissipated by evaporation from cover 7 of liquid which condenses on the outer wall at the lower part of 2b.

Between the liquid container 3b and the cover 2b a connecting tube 8 is fitted, through which liquid condensed in the lower part of 2b can be returned to 3b. The liquid lock 9 in this tube serves to prevent liquid evaporated from the bulb 1b from coming into the container 3b by condensation.

The small porous bulb 1b may, for instance, be made of stoneware or sintered glass. Sintered glass preferably is used when only a certain wave length field from the incident radiation is to be measured. In the latter case care has to be taken that the glass is coloured in such a way that exclusively the desired radiation is absorbed.

In this embodiment not the amount of condensed liquid is measured but the amount of liquid taken away from the container 4 in a given space of time.

For the rest the working of the apparatus according to Fig. 2 is in principle the same as that of the apparatus according to Fig. 1, so that no further explanation is needed.

It will be understood that various changes in or departures from the form or arrangement of the illustrative embodiments may be made without departing from the principles of the invention herein described and claimed.

We claim:

1. An apparatus for measuring radiation by vaporization, comprising two concentric bulbs in spaced relation, the outer bulb being pervious to the radiation to be measured and the inner bulb being absorptive to such radiation and containing a liquid vaporizable by energy of such radiation and having space therein for vapors that result, and a measuring tube for holding a quantity of the liquid connected with at least one of said bulbs, characterized in that the vapor space of the inner bulb communicates with the space between the bulbs so that the two bulbs stay at practically the same temperature through evaporation to and condensation on the outer bulb.

2. An apparatus as described in claim 1, wherein the measuring tube has an extension passing through the walls of both bulbs and opening into the vapor space of the inner bulb, characterized in that the portion of said extension between the two bulbs has at least one aperture providing a passageway for vapors to enter the space between the bulbs and a passageway for conducting liquid condensed on the inner surface of the outer bulb into the measuring tube.

3. An apparatus for measuring radiation by vaporization, comprising two concentric bulbs in spaced relation, the outer bulb being pervious to the radiation to be measured and the inner bulb being absorptive to such radiation and containing a liquid vaporizable by energy of such radiation, and a measuring tube for holding a quantity of such liquid and connected with at least one of said bulbs, characterized in that the wall of the inner bulb is made of porous material permeable to the vapors of said liquid but impermeable to the liquid itself.

4. In an apparatus for measuring radiation by vaporization, comprising two concentric bulbs in spaced relation, the outer bulb being pervious to the radiation to be measured and the inner bulb being absorptive to such radiation and containing a liquid vaporizable by energy of such radiation, and a measuring tube for holding a quantity of such liquid and connected with at least one of said bulbs, the inner bulb being in the form of a solid porous body permeable to vapors of the liquid and holding liquid by capillary action, the outer bulb having a tubular branch, a feed tube extending through and inside said branch to said inner bulb and having means for leading liquid by capillary action thereto, the measuring tube being connected with said feed tube for holding a quantity of the liquid in communication therewith, said measuring tube providing space for vapors above the liquid therein, and a tube connecting said vapor space with said tubular branch of the outer bulb.

5. An apparatus as described in claim 4, said capillary active means being a mass of finely divided material filling said feed tube.

6. An apparatus as described in claim 4, said connecting tube having a liquid seal therein to prevent passage of vapors between the outer bulb and the measuring tube.

7. An apparatus as described in claim 4, said tubular branch having a lower part extending below the place of connection of said connecting tube for collecting liquid condensed on said outer bulb.

8. An apparatus as described in claim 7, said feed tube having, inside said tubular branch and extending into its lower part, a cover of material absorptive to the condensed liquid.

9. An apparatus as described in claim 8, said cover material being sintered milk-glass.

WILLEM JOHANNES DOMINICUS VAN DIJCK.
LEO ADRIAAN GINSEL.

REFERENCES CITED

The following references are of record in the file of this patent:

UNITED STATES PATENTS

| Number | Name | Date |
|---|---|---|
| 1,911,426 | Brodie | May 30, 1933 |
| 2,282,447 | Barnhart | May 12, 1942 |

FOREIGN PATENTS

| Number | Country | Date |
|---|---|---|
| 425,707 | Great Britain | Mar. 20, 1935 |
| 438,699 | Great Britain | Nov. 21, 1935 |
| 453,761 | Great Britain | Sept. 17, 1936 |
| 680,819 | France | Jan. 23, 1930 |